United States Patent
Woo et al.

(10) Patent No.: US 8,880,577 B2
(45) Date of Patent: Nov. 4, 2014

(54) MODULO OPERATION METHOD AND APPARATUS FOR SAME

(75) Inventors: Jung Uk Woo, Hwaseong-si (KR); In Tae Kang, Seongnam-si (KR); Yun Ju Kwon, Yongin-si (KR); Dong Min Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 13/377,650

(22) PCT Filed: Jun. 10, 2010

(86) PCT No.: PCT/KR2010/003719
§ 371 (c)(1),
(2), (4) Date: Dec. 12, 2011

(87) PCT Pub. No.: WO2010/143892
PCT Pub. Date: Dec. 16, 2010

(65) Prior Publication Data
US 2012/0089658 A1    Apr. 12, 2012

(30) Foreign Application Priority Data

Jun. 10, 2009   (KR) .................. 10-2009-0051480

(51) Int. Cl.
*G06F 7/52*   (2006.01)
*G06F 7/72*   (2006.01)
*G06F 7/535*  (2006.01)

(52) U.S. Cl.
CPC ... *G06F 7/72* (2013.01); *G06F 7/535* (2013.01); *G06F 2207/5353* (2013.01)
USPC .......................................... 708/650; 708/491

(58) Field of Classification Search
CPC .......... G06F 7/52; G06F 7/535; G06F 7/537; G06F 7/5375; G06F 7/49931; G06F 7/72
USPC .......................... 708/650, 653, 655, 656, 491
See application file for complete search history.

(56) References Cited

U.S. PATENT DOCUMENTS 4,550,339 A    10/1985   Fling
5,121,429 A     6/1992   Guppy et al.
(Continued)

FOREIGN PATENT DOCUMENTS

| KR | 10-0195719 B1 | 6/1999 |
| KR | 10-0206116 B1 | 7/1999 |

*Primary Examiner* — Chuong D Ngo
(74) *Attorney, Agent, or Firm* — Jefferson IP Law, LLP (57) ABSTRACT

The present invention provides a modulo operation method. The modulo operation method, in a case where the square of a divisor N is greater than or equal to a dividend C, includes: determining the number of computation stages n satisfying $2^n < N \leq 2^{n+1}$; performing an initialization operation by initializing a constant a to the smallest integer greater than or equal to half of N; performing a first operation by subtracting, when C is greater than or equal to N·a (product of N and a), the value of C by the value of N·a; and performing a second operation by assigning the smallest integer greater than or equal to half of a to the value of a, wherein the value of C is output as the result of modulo operation after the first operation and the second operation are repeated n times. In the first operation, when C is less than N·a, the value of C is unchanged. In the modulo operation method and apparatus of the present invention, the amount of computation in a modulo operation or division operation does not increase in linear proportion to the magnitude of the divisor N but increases in proportion to log N. As a result, the total amount of computation decreases and computation speed increases.

9 Claims, 4 Drawing Sheets

(56) References Cited

U.S. PATENT DOCUMENTS

| | | | |
|---|---|---|---|
| 5,237,525 A * | 8/1993 | Rossbach | 708/655 |
| 5,563,818 A * | 10/1996 | Agarwal et al. | 708/400 |
| 5,638,314 A | 6/1997 | Yoshida | |
| 2006/0173949 A1 * | 8/2006 | Lee | 708/650 |
| 2006/0179102 A1 | 8/2006 | Carlough et al. | |

* cited by examiner

MODULO OPERATION METHOD AND APPARATUS FOR SAME

TECHNICAL FIELD

The present invention relates to a modulo operation method and apparatus and, more particularly, to a modulo operation method and apparatus that can be used to generate a preamble signal that is transmitted through a Physical Random Access Channel (PRACH) for synchronization acquisition in a Long Term Evolution (LTE) wireless communication system.

BACKGROUND ART

In an LTE wireless communication system, a modulo operation specified by Equation 1 is used to generate a preamble signal, which is transmitted through the physical random access channel (PRACH) for synchronization acquisition.

$(a \cdot b) \bmod N$ (where, $0 < a, b \le N$)   <Equation 1>

In the related art, a linear search scheme is employed to physically implement the modulo operation in Equation 1. In this scheme, using comparison between the dividend at and the divisor N, subtraction and comparison operations are repeated until the value of $(a \cdot b) \cdot N$ becomes less than the value of N, and the final result becomes the remainder. However, utilization of such a linear search scheme for the modulo operation of Equation 1 necessitates employment of a divider, which may increase hardware complexity and worsen synthesis timing.

In performing the modulo operation using the above linear search scheme, as the amount of computation is linearly proportional to the magnitude of the dividend $a \cdot b$, many stages of computation are needed to obtain the remainder and hence computation time becomes longer. In addition, as the divisor N becomes larger, the above related art method becomes less effective.

DISCLOSURE OF INVENTION

Technical Problem

The present invention has been made in view of the above problems, and the present invention is to provide a modulo operation method and apparatus that can reduce the amount of computation and increase computation speed using a pipeline modulo operation.

The present invention also provides a modulo operation method and apparatus that can perform a modulo operation without a divider.

Technical Solution

An aspect of the present invention is to provide a modulo operation method, in a case where the square of a divisor N is greater than or equal to a dividend C, including: determining the number of computation stages n satisfying $2^n < N \le 2^{n+1}$; performing an initialization operation by initializing a constant a to the smallest integer greater than or equal to half of N; performing a first operation by subtracting, when C is greater than or equal to $N \cdot a$ (product of N and a), the value of C by the value of $N \cdot a$; and performing a second operation by assigning the smallest integer greater than or equal to half of a to the value of a, wherein the value of C is output as the result of modulo operation after the first operation and the second operation are repeated n times. In the first operation, when C is less than $N \cdot a$, the value of C is unchanged.

Another aspect of the present invention is to provide a modulo operation apparatus, in a case where the square of a divisor N is greater than or equal to a dividend C, including: a plurality of operation blocks connected in series, wherein each operation block comprises a multiplier taking N and a constant a as input to multiply N and a, a subtractor taking C and the output of the multiplier as input to subtract C by the output of the multiplier, and a first comparator taking C and the output of the subtractor to output, when C is greater than or equal to $N \cdot a$, the output of the subtractor as updated C; and a control block computing the number of operation blocks n satisfying $2^n < N \le 2^{n+1}$, setting the initial value of a to the smallest integer greater than or equal to half of N, and assigning the smallest integer greater than or equal to half of a input to the x-th operation block to the value of a input to the x+1-th operation block, wherein the updated value of C output by the n-th operation block is the result of modulo operation. When C is less than $N \cdot a$, the first comparator produces C without modification as updated C.

Still another aspect of the present invention is to provide a modulo operation apparatus, in a case where the square of a divisor N is greater than or equal to a dividend C, including: an operation block comprising a multiplier taking N and a constant a as input to multiply N and a, a subtractor taking C and the output of the multiplier as input to subtract C by the output of the multiplier, and a first comparator taking C and the output of the subtractor to output, when C is greater than or equal to $N \cdot a$, the output of the subtractor as updated and feed updated C back to the subtractor; and a control block computing the number of repetition stages n satisfying $2^n < N \le 2^{n+1}$, setting the initial value of a to the smallest integer greater than or equal to half of N, and assigning the smallest integer greater than or equal to half of a input to the x-th repetition stage to the value of a input to the x+1-th repetition stage, wherein the updated value of C output by the n-th repetition stage is the result of modulo operation. When C is less than $N \cdot a$, the first comparator outputs C without modification as updated C and inputs updated C to the subtractor.

Advantageous Effects

In the modulo operation method and apparatus of the present invention, the amount of computation in a modulo operation or division operation does not increase in linear proportion to the magnitude of the divisor N but increases in proportion to log N. As a result, the total amount of computation decreases and computation speed increases.

BRIEF DESCRIPTION OF THE DRAWINGS

The objects, features and advantages of the present invention will be more apparent from the following detailed description in conjunction with the accompanying drawings, in which.

MODE FOR THE INVENTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Particular terms may be defined to describe the invention in the best manner. Accordingly, the meaning of specific terms or words used in the specification and the claims should not be limited to the literal or commonly employed sense, but should be construed in accordance with the spirit of the invention.

First, a description is given of generation of a preamble signal transmitted through the physical random access channel (PRACH) in an LTE wireless communication system. Generation of a PRACH preamble signal involves: cyclic shifting of Zadoff-Chu (ZC) sequences of length 839 to obtain ZC sequences with zero correlation zone (ZC-ZCZ); and computing the 839-point discrete Fourier transform (DFT) of ZC-ZCZ. However, direct use of a DFT block for PRACH may result in too high hardware complexity and memory waste, considering usage frequencies of the channel used only for random access. Hence, the DFT of ZC-ZCZ may be computed using constant amplitude zero autocorrelation (CAZAC) sequences similar to the DFT of ZC-ZCZ instead of directly computing 839-point DFT.

To be more specific, the u-th root Zadoff-Chu sequence of length (Nzc) 839 is defined by Equation 2.

$$x_u(n) = e^{-j\frac{\pi u n(n+1)}{Nzc}} = W^{\frac{un(n+1)}{2}}, \quad \text{<Equation 2>}$$
$$\text{where } 0 \le n \le Nzc - 1 \text{ and } W = e^{-j\frac{2\pi}{Nzc}}$$

The discrete Fourier transform of a ZC sequence $x_u(n)$ may be represented as a CAZAC sequence given by Equation 3.

$$X_u(k) = W^{-\frac{k(k+u)}{2u}} \sum_{n=0}^{Nzc-1} x_u(n+d), \quad \text{<Equation 3>}$$
$$\text{where } d = \frac{n}{u} \mod Nzc$$

A PRACH preamble signal is generated using ZC-ZCZ obtained by cyclic shifting of the ZC sequence (not using ZC-ZCZ itself), and ZC-ZCZ obtained by cyclic shifting of the ZC sequence (Equation 2) is given by Equation 4.

$$x_{v,n}(n) = x_u((n+Cv) \mod Nzc) \quad \text{<Equation 4>}$$

It is possible to compute the DFT of ZC-ZCZ sequences using Equation 3 (ZC sequence-CAZAC sequence relation) and Equation 4 (ZC sequence—ZC-ZCZ sequence relation). In the physical random access channel of the LTE wireless communication system, a preamble signal is generated through computation of the DFT of ZC-ZCZ sequences as in Equation 5.

$$\varphi(k) = ((\varphi_1(k) + \varphi_2(k)) \mod Nzc) = \quad \text{<Equation 5>}$$
$$(((2u)^{-1} k(k+u)) \mod Nzc) +$$
$$((Cvk \mod Nzc) \mod Nzc)$$

However, it is necessary to perform a modulo operation as in Equation 1 to obtain the value of Equation 5. As described before, in the related art, a linear search scheme is employed to perform the modulo operation. In performing the modulo operation using the linear search scheme, as the amount of computation is linearly proportional to the length Nzc, obtaining the remainder requires many computation stages and a long computation time.

To solve this problem, the present invention provides a modulo operation method that, for given C and N, when the modulo operation can be represented in a form of Equation 6; can produce the quotient x and the remainder m within a minimum number of computation stages (n).

$$a \cdot b = Nx + m \text{ (where, } a \cdot b \le N^2 \text{)} \quad \text{<Equation 6>}$$

More specifically, to find the quotient x satisfying Equation 6, a first value greater than $$\left\lceil \frac{N}{2} \right\rceil$$

is found; when x is determined to be present in an • interval greater than $$\left\lceil \frac{N}{2} \right\rceil \left( a \cdot b \ge N \left\lceil \frac{N}{2} \right\rceil \right),$$

a second value greater than $$\left\lceil \frac{N}{2} \right\rceil + \left\lceil \frac{\left\lceil \frac{N}{2} \right\rceil}{2} \right\rceil$$

is found, and when x is determined to be not present in the interval greater than $$\left\lceil \frac{N}{2} \right\rceil \left( a \cdot b < N \left\lceil \frac{N}{2} \right\rceil \right),$$

a third value greater than $$\left\lceil \frac{\left\lceil \frac{N}{2} \right\rceil}{2} \right\rceil$$

is found.

Repetition of the above process n times may produce the quotient x and the remainder m, and the minimum number of computation stages for finding the quotient and the remainder may be set to n satisfying Equation 7.

$$2^n N \le 2^{n+1} \quad \text{<Equation 7>}$$

Figure 1:
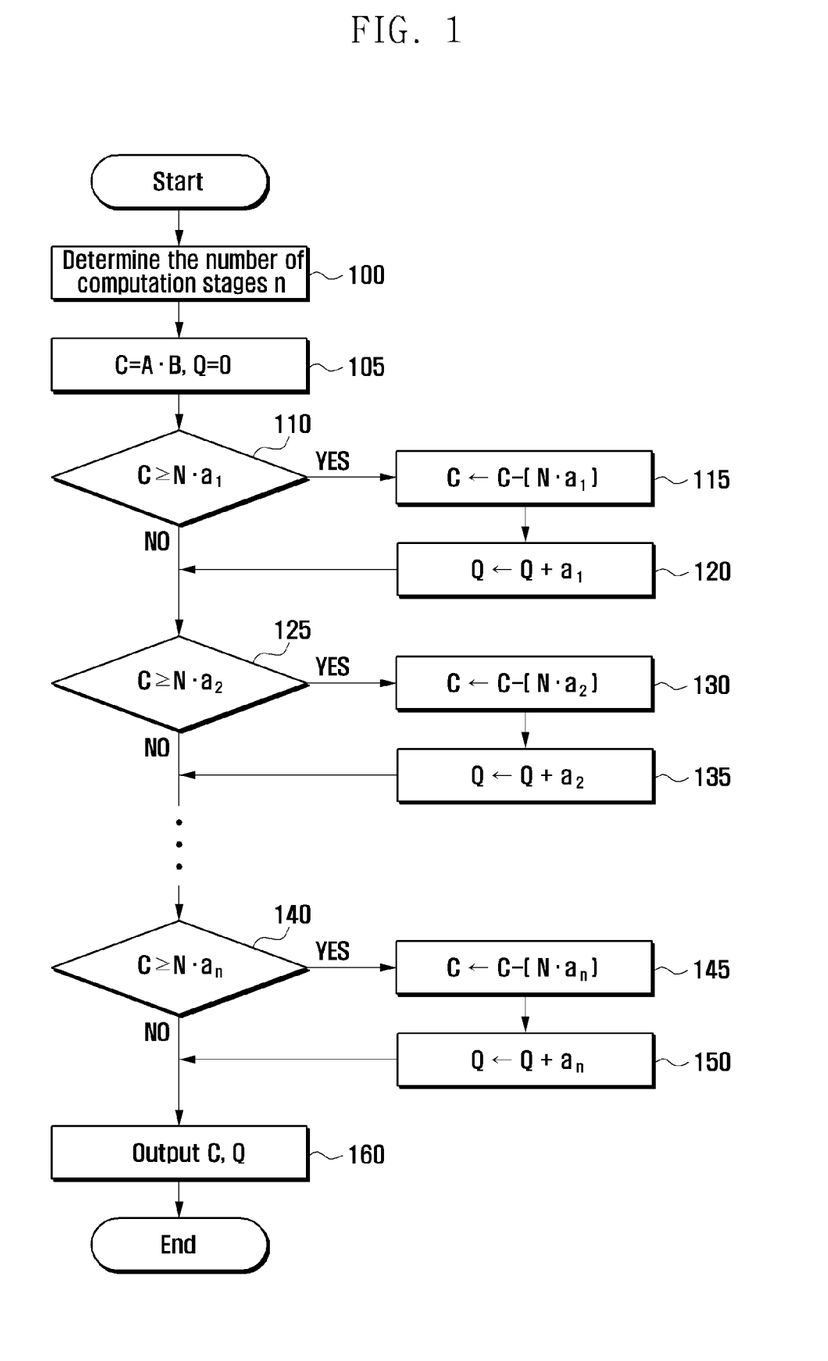
FIG. 1 is a flowchart of a modulo operation method according to an embodiment of the present invention.

FIG. 1 is a flowchart of a modulo operation method for a wireless communication system according to an embodiment of the present invention. Here, the modulo operation method is applied when the dividend (a·b=C) is less than or equal to the square of the divisor (N). In the following description, for ease of description, it is assumed that a=b=11 and N=13.

Referring to FIG. 1, when the divisor N is given for modulo operation, the number of computation stages n satisfying $2^n < N \le 2^{n+1}$ is determined (100). For example, as $2^3 < N \le 2^{3+1}$ ($8<13≤16$), the number of computation stages for the modulo operation is 3. The dividend C is initialized to the value of a·b (i.e., 121) and the quotient Q is initialized to 0 (105).

Whether the dividend C is greater than or equal to the product of the divisor N and a constant $a_1$ is determined (110). Here, C is 121, and $a_1$ is $$\left\lceil \frac{N}{2} \right\rceil$$

(i.e., the smallest integer greater than or equal to half the divisor N). Hence, $a_1$ is set to 7

$$\left(\left\lceil \frac{13}{2} \right\rceil\right).$$

When C is greater than or equal to $N \cdot a_1$ at step 110, the value of C is subtracted by the value of $N \cdot a_1$ (115), the value of Q is incremented by $a_1$ (120), and computation proceeds to step 125 (the next stage). When C is less than $N \cdot a_1$ at step 110, computation proceeds to step 125 (the next stage). At this stage, as C is 121 and $N \cdot a_1$ is 91, C is greater than $N \cdot a_1$. Hence, C is reset to 30 (=121−91) and Q is reset to 7.

Whether the updated dividend C is greater than or equal to the product of the divisor N and a constant $a_2$ is determined (125). Here, $a_2$ is $$\left\lceil \frac{a_1}{2} \right\rceil$$

(i.e., the smallest integer greater than or equal to half of $a_1$). Hence, $a_2$ is set to 4

$$\left(\left\lceil \frac{7}{2} \right\rceil\right).$$

When C is greater than or equal to $N \cdot a_2$ at step 125, the value of C is subtracted by the value of $N \cdot a_2$ (130), the value of Q is incremented by $a_2$ (135), and computation proceeds to step 140 (the next stage). When C is less than $N \cdot a_2$ at step 125, computation proceeds to step 140 (the next stage). At this stage, as C is 130 and $N \cdot a_2$ is 52, C is less than $N \cdot a_2$. Hence, computation proceeds to step 140 without update of C or Q.

Whether C is greater than or equal to the product of N and $a_3$ is determined (140). Here, $a_3$ is $$\left\lceil \frac{a_2}{2} \right\rceil$$

(i.e., the smallest integer greater than or equal to half of $a_2$). Hence, $a_3$ is set to 2

$$\left(\left\lceil \frac{4}{2} \right\rceil\right).$$

When C is greater than or equal to $N \cdot a_3$ at step 140, the value of C is subtracted by the value of $N \cdot a_3$ (145), the value of Q is incremented by $a_3$ (150), and computation proceeds to the next stage. When C is less than $N \cdot a_3$ at step 140, computation proceeds to the next stage. In the present example, as the number of stages is preset to 3 at step 100, the next stage is absent and hence the final result will be output. At this stage, as C is 30 and $N \cdot a_3$ is 26, C is greater than $N \cdot a_3$. Hence, C is reset to 4 (=30−26) and Q is reset to 9.

As a result, as $11 \times 11 = (13 \times 9) + 4$, both a modulo operation and a division operation are performed through three stages of computation.

Although only three stages involving steps 110, 125 and 140 are depicted for the case of N=13 in FIG. 1, those skilled in the art of the present invention may readily increase or decrease the number of computation stages according to the magnitude of N.

Figure 2:
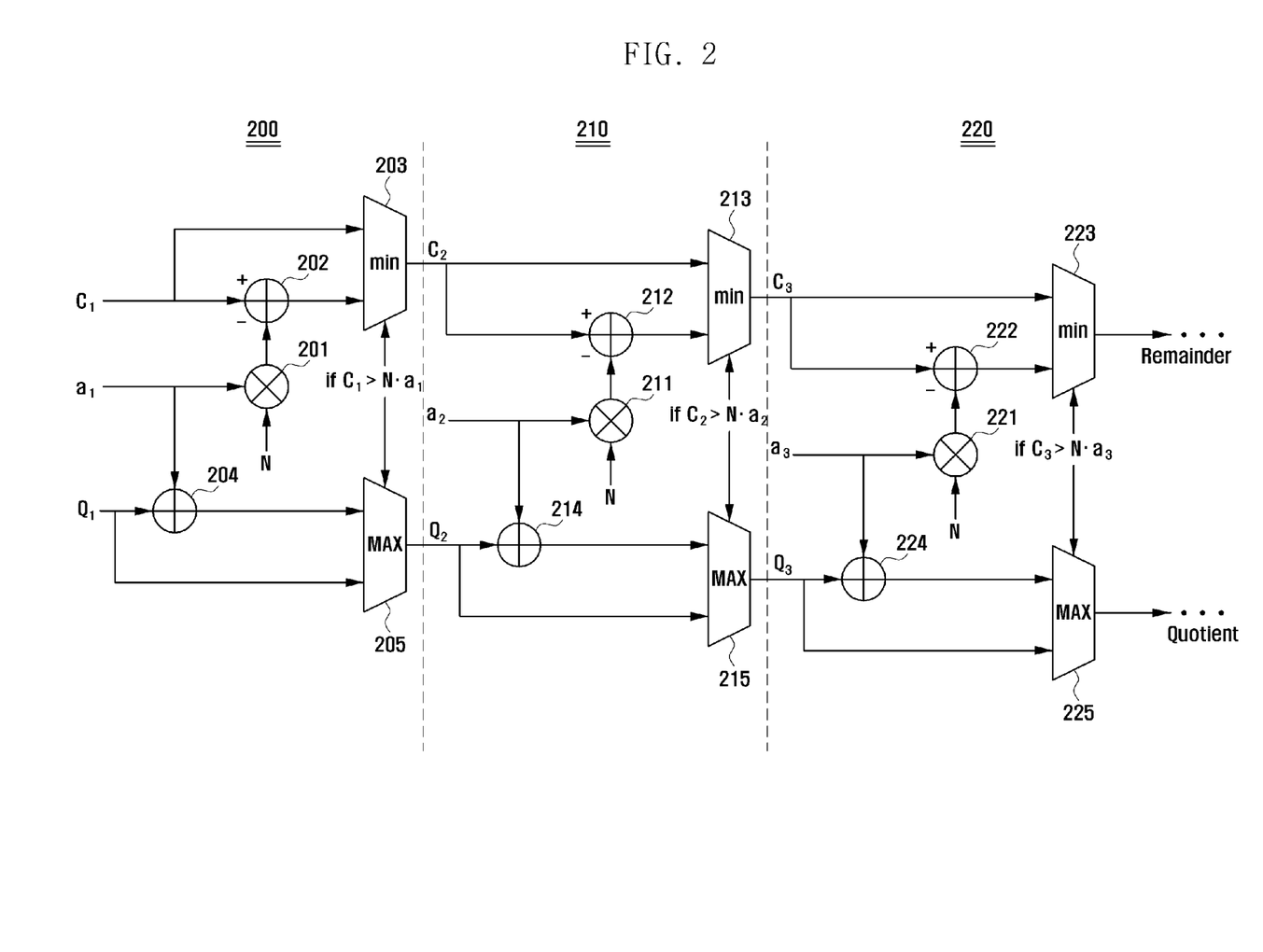
FIG. 2 is a block diagram of a modulo operation apparatus according to another embodiment of the present invention.

FIG. 2 is a block diagram of a modulo operation apparatus for a wireless communication system according to another embodiment of the present invention. In the following description, for ease of description, it is also assumed that a=b=11 and the divisor N is 13. Additionally, in FIG. 2, as n satisfying $2^n < N \le 2^{n+1}$ is 3, operation blocks 200, 210 and 220 are depicted for three computation stages. However, those skilled in the art of the present invention may readily increase or decrease the number of operation blocks according to the magnitude of N.

Referring to FIG. 2, an operation block of the modulo operation apparatus in a wireless communication system includes a multiplier 201, a subtractor 202 and a first comparator 203 for modulo operation, and further includes an adder 204 and a second comparator 205 for division operation. In an embodiment of the present invention, the modulo operation apparatus is composed of operation blocks connected in series, where the number of operation blocks corresponds to the number of computation stages. Hence, for the case of N=13, the modulo operation apparatus is composed of three operation blocks connected in series.

When the divisor N is given for modulo operation, the number of modulo operation blocks n satisfying $2^n < N \le 2^{n+1}$ is determined. For example, as $2^3 < N \le 2^{3+1}$ ($8<13≤16$), the number of modulo operation blocks is 3.

Initially, input $C_1$ (dividend) is initialized to the value of at and input $a_1$ (constant) is initialized to $$\left\lceil \frac{N}{2} \right\rceil,$$

and Q is initialized to 0. Here, $C_1$ is set to 121, and $a_1$ is set to 7

$$\left(\left\lceil \frac{13}{2} \right\rceil\right).$$

The modulo operation is described first. At the first-stage operation block 200, an input constant $a_1$ is multiplied by the dividend N by the multiplier 201, and $C_1$ is subtracted by $N \cdot a_1$ by the subtractor 202. The first comparator 203 outputs, when $C_1$ is greater than or equal to $N \cdot a_1$, the result of the subtractor 202 as an input ($C_2$) to the second-stage operation block 210, and outputs, when $C_1$ is less than $N \cdot a_1$, $C_1$ as an input ($C_2$) to the second-stage operation block 210. At this stage, as $C_1$ is 121 and $N \cdot a_1$ is 91, $C_1$ is greater than $N \cdot a_1$. Hence, the first comparator 203 outputs 30 (result of the subtractor 202) as an input ($C_2$) to the second-stage operation block 210.

In addition, $Q_1$ and $a_1$ are added by the adder 204, and $Q_1$ and the output of the adder 204 are input to the second comparator 205. The second comparator 205 outputs, when $C_1$ is greater than or equal to $N \cdot a_1$, the result of the adder 204 as an input ($Q_2$) to the second-stage operation block 210, and outputs, when $C_1$ is less than $N \cdot a_1$, $Q_1$ as an input ($Q_2$) to the second-stage operation block 210. Here, as $C_1$ is greater than $N \cdot a_1$, the second comparator 205 outputs 7 (output of the adder 204) as an input ($Q_2$) to the second-stage operation block 210.

At the second-stage operation block 210, input $a_2$ is multiplied by N by the multiplier 211, and input $C_2$ is subtracted by $N \cdot a_2$ by the subtractor 212. Here, $a_2$ is $$\lceil \frac{a_1}{2} \rceil$$

(i.e., the smallest integer greater than or equal to half of $a_1$). Hence, $a_2$ is set to 4

$$(\lceil \frac{7}{2} \rceil).$$

The first comparator 213 outputs, when $C_2$ is greater than or equal to $N \cdot a_2$, the result of the subtractor 212 as an input ($C_3$) to the third-stage operation block 220, and outputs, when $C_2$ is less than $N \cdot a_2$, $C_2$ as an input ($C_3$) to the third-stage operation block 220. At this stage, as $C_2$ is 30 and $N \cdot a_2$ is 52, $C_2$ is less than $N \cdot a_2$. Hence, the first comparator 213 outputs $C_2$ as an input ($C_3$) to the third-stage operation block 220.

In addition, $Q_2$ and $a_2$ are added by the adder 214 (7+4=11), and $Q_2$ and the output of the adder 214 are input to the second comparator 215. The second comparator 215 outputs, when $C_2$ is greater than or equal to $N \cdot a_2$, the result of the adder 214 as an input ($Q_3$) to the third-stage operation block 220, and outputs, when $C_2$ is less than $N \cdot a_2$, $Q_2$ as an input ($Q_3$) to the third-stage operation block 220. Here, as $C_2$ is less than $N \cdot a_2$, the second comparator 215 outputs 7 ($Q_2$) as an input ($Q_3$) to the third-stage operation block 220.

At the third-stage operation block 220, input $a_3$ is multiplied by N by the multiplier 221, and input $C_3$ is subtracted by $N \cdot a_3$ by the subtractor 222. Here, $a_3$ is $$\lceil \frac{a_2}{2} \rceil$$

(i.e., the smallest integer greater than or equal to the half of $a_2$). Hence, $a_3$ is set to 2

$$(\lceil \frac{4}{2} \rceil).$$

The first comparator 223 outputs, when $C_3$ is greater than or equal to $N \cdot a_3$, the result of the subtractor 222 as the result of modulo operation, and outputs, when $C_3$ is less than $N \cdot a_3$, $C_3$ as the result of modulo operation. At this stage, as $C_3$ is 30 and $N \cdot a_3$ is 26, $C_3$ is greater than $N \cdot a_3$. Hence, the first comparator 223 outputs 4 (output of the subtractor 222) as the result of modulo operation.

In addition, $Q_3$ and $a_3$ are added by the adder 224 (7+2=9), and $Q_3$ and the output of the adder 224 are input to the second comparator 225. The second comparator 225 outputs, when $C_3$ is greater than or equal to $N \cdot a_3$, the result of the adder 224 as the result of division operation, and outputs, when $C_3$ is less than $N \cdot a_3$, $Q_3$ as the result of division operation. Here, as $C_3$ is greater than $N \cdot a_3$, the second comparator 225 outputs 9 (output of the adder 224) as the result of the division operation.

The modulo operation apparatus for a wireless communication system may further include a control block (not shown) to compute the number of computation stages n and set constant $a_1$ to the smallest integer greater than or equal to half of the divisor N. In addition, the control block may set $a_x$ to the smallest integer greater than or equal to half of $a_{x-1}$ and input $a_x$ to the x-th computation stage, and control n operation blocks to perform the modulo operation method of the present invention.

Figure 3:
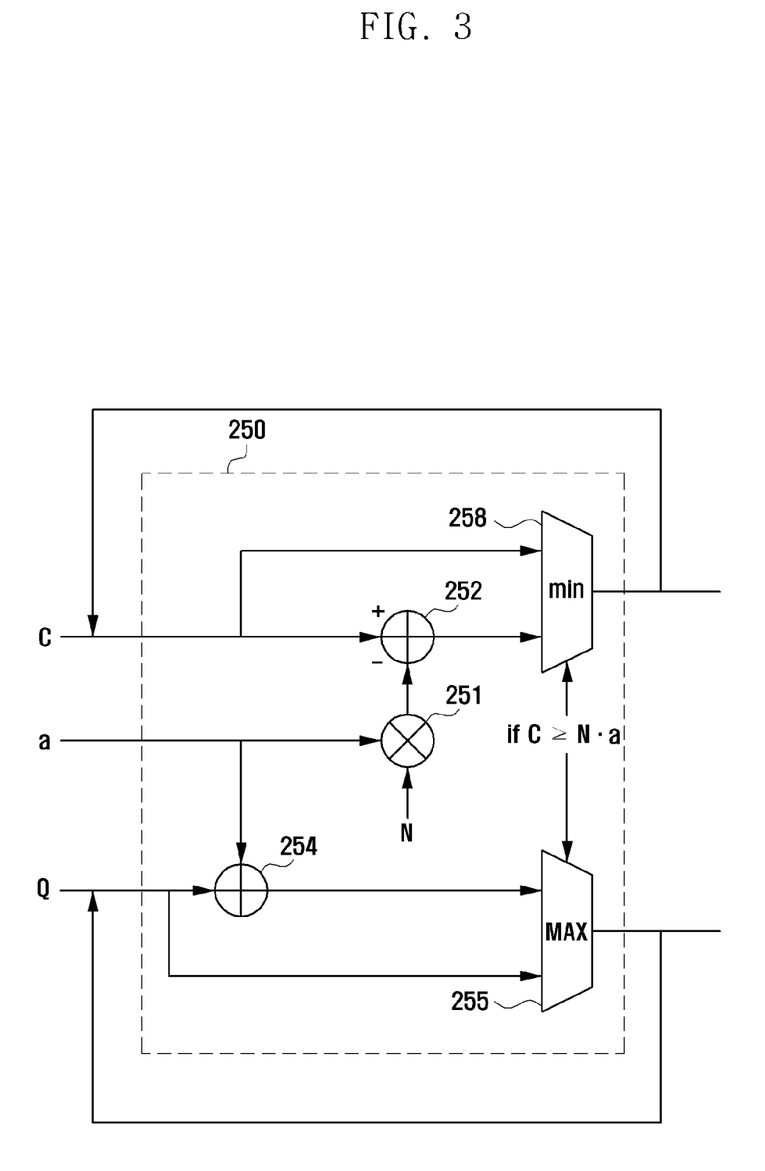
FIG. 3 is a block diagram of a modulo operation apparatus according to another embodiment of the present invention.

FIG. 3 is a block diagram of a modulo operation apparatus for a wireless communication system according to another embodiment of the present invention. The modulo operation apparatus of FIG. 3, unlike the modulo operation apparatus of FIG. 2 composed of operation blocks connected in series, is composed of a single operation block 250 operating in a recursive manner.

Referring to FIG. 3, the operation block 250 operating in a recursive manner includes a multiplier 251, a subtractor 252 and a first comparator 253 for modulo operation, and further includes an adder 254 and a second comparator 255 for division operation. Unlike the modulo operation apparatus of FIG. 2, the modulo operation apparatus of FIG. 3 is configured so that the results of the x−1th repetition operation are input to the x-th repetition operation, and includes a control block (not shown) to compute the number of repetition operations n and to output C and Q as the remainder and the quotient after n repetitions.

In addition, the control block initializes constant a to the smallest integer greater than or equal to half of the divisor N, and sets the value of a for x+1th repetition to the smallest integer greater than or equal to half of a at the x-th repetition.

Figure 4:
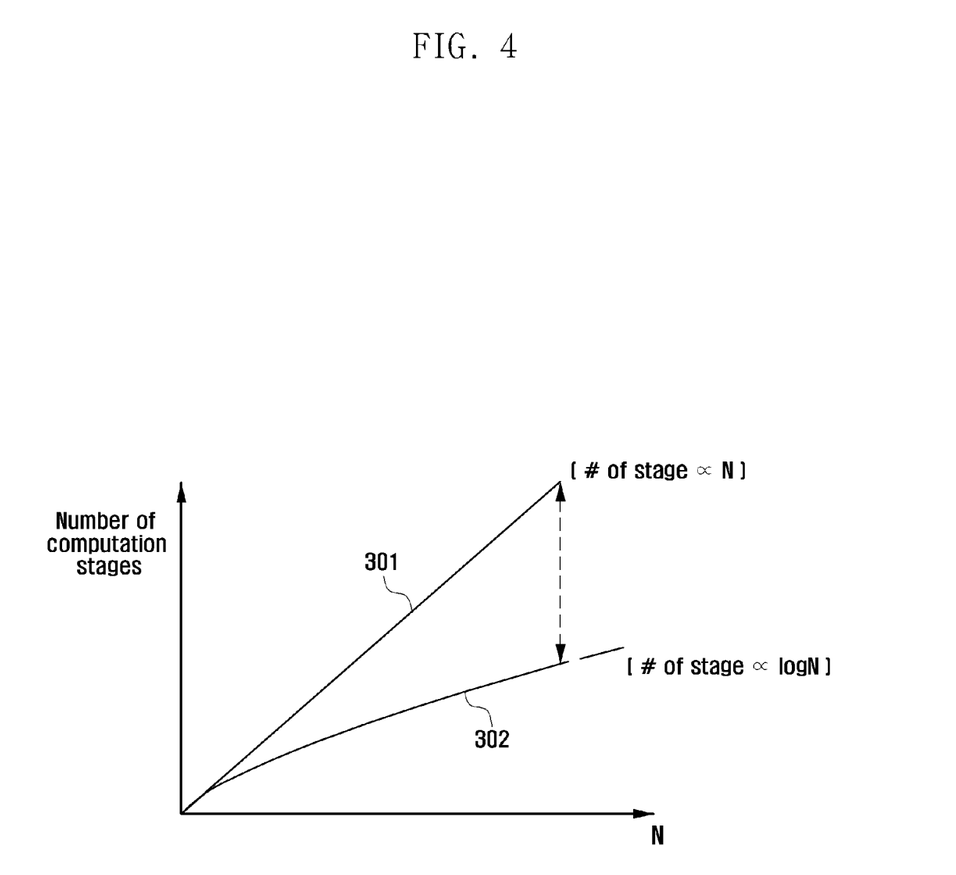
FIG. 4 illustrates performance of the modulo operation method of the present invention in comparison to a related art modulo operation method.

FIG. 4 illustrates performance of the modulo operation method for a wireless communication system of the present invention in comparison to a related art modulo operation method. In FIG. 4, according to the magnitude of the divisor N, the number of computation stages in the method of the present invention is compared with that of a related art method.

Referring to FIG. 4, the modulo operation apparatus of the present invention performs a pipeline modulo operation of log N computation stages to thereby significantly reduce the number of computation stages and remarkably increase computation speed, in comparison to related art technology. Reference symbol 301 indicates performance of a related art modulo operation method based on linear search, where the number of computation stages increases in linear proportion to the divisor N.

Reference symbol 302 indicates performance of the modulo operation method of the present invention, where the number of computation stages increases in proportion to the logarithm of the divisor N. Hence, as the divisor N increases, the effect of decrease in the number of computation stages increases.

INDUSTRIAL APPLICABILITY

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. A method, performed by an apparatus for outputting a result of a modulo operation, in a case where the square of a divisor N is greater than or equal to a dividend C, comprising:

determining, by a controller of the apparatus, the number of computation stages n satisfying $2n < N \le 2n+1$;

performing, by the controller, an initialization operation by initializing a constant a to the smallest integer greater than or equal to half of N;

performing, by an operating circuit, a first operation by subtracting, when C is greater than or equal to N·a, the value of C by the value of N·a, and outputting the result of the subtraction as the value of C, wherein N·a is the product of N and a;

performing, by the controller, a second operation by assigning the smallest integer greater than or equal to half of a to the value of a;

repeatedly performing, by the controller, the first operation and the second operation n times;

outputting, by the controller, the value of C as the result of modulo operation to a transceiver of the apparatus;

using a result of the modulo operation in a generation of a preamble signal; and transmitting, by the transceiver, the preamble signal through a physical random access channel.

2. The method of claim 1, wherein, in the first operation, when C is less than N·a, the value of C is unchanged.

3. The method of claim 1, wherein a quotient Q for division operation is initialized to 0 at the initialization operation and at the first operation, when C is greater than or equal to N·a, the value of Q is added by the value of a, and wherein the value of Q is output as the result of division operation after the first operation and the second operation are repeated n times.

4. A modulo operation apparatus, in a case where the square of a divisor N is greater than or equal to a dividend C, comprising:

a plurality of operation blocks connected in series, and a control block determining the number of computation stages n satisfying $2^n < N \le 2^{n+1}$, setting a constant a of a 1st operation block to the smallest integer greater than or equal to half of N, setting a constant a of x-th operation block to the smallest integer greater than or equal to half of a of x−1-th operation block, and outputting the value of C output from n-th operation block as the result of a modulo operation, wherein each operation block comprises:

a multiplier taking N and a as input and outputting the value of N·a, wherein N·a is the product of N and a;

a subtractor taking C output from the x−1-th operation block and the value of N·a output from the multiplier as input, and outputting the value of subtracting the value of N·a from C; and a first comparator taking C output from the x−1-th operation block and the value of N·a output from the multiplier as input, and outputting output of the subtractor as the value of C for the next operation block, when C is greater than or equal to N·a.

5. The modulo operation apparatus of claim 4, wherein the first comparator outputs, when C is less than N·a, C without modification as updated C.

6. The modulo operation apparatus of claim 4, wherein each operation block further comprises:

an adder taking a quotient Q for division operation as input to add Q by a; and a second comparator outputting, when C is greater than or equal to N·a, the output of the adder as updated Q, and outputting, when C is less than N·a, Q without modification as updated Q, wherein the updated value of Q output by the n-th operation block is the result of division operation.

7. A modulo operation apparatus, in a case where the square of a divisor N is greater than or equal to a dividend C, comprising:

an operation block; and a control block determining the number of computation stages n satisfying $2^n < N \le 2^{n+1}$, setting a constant a of a 1st operation block to the smallest integer greater than or equal to half of N, setting a constant a of x-th operation block to the smallest integer greater than or equal to half of a of x−1-th operation block, and outputting the value of C output from n-th operation block as the result of modulo operation, wherein the operation block comprises:

a multiplier taking N and a as input and outputting the value of N·a, wherein N·a is the product of N and a;

a subtractor taking C output from the x−1-th operation block and the value of N·a output from the multiplier as input, and outputting the value of subtracting the value of N·a from C; and a first comparator taking C output from the x−1-th operation block and the value of N·a output from the multiplier as input, and outputting the output of the subtractor as the value of C for the next operation block, when C is greater than or equal to N·a.

8. The modulo operation apparatus of claim 7, wherein the first comparator outputs, when C is less than N·a, C without modification as updated C and inputs updated C to the subtractor.

9. The modulo operation apparatus of claim 7, wherein the operation block further comprises:

an adder taking a quotient Q for division operation as input to add Q by a; and a second comparator outputting, when C is greater than or equal to N·a, the output of the adder as updated Q, outputting, when C is less than N·a, Q without modification as updated Q, and feeding updated Q back to the adder, wherein the updated value of Q output by the n-th repetition stage is the result of division operation.

\* \* \* \* \*